Aug. 10, 1937.  J. SNEED  2,089,508
BRAKE
Original Filed March 16, 1929  2 Sheets-Sheet 1

Inventor
JOHN SNEED.
By Richey & Watts
Attorneys

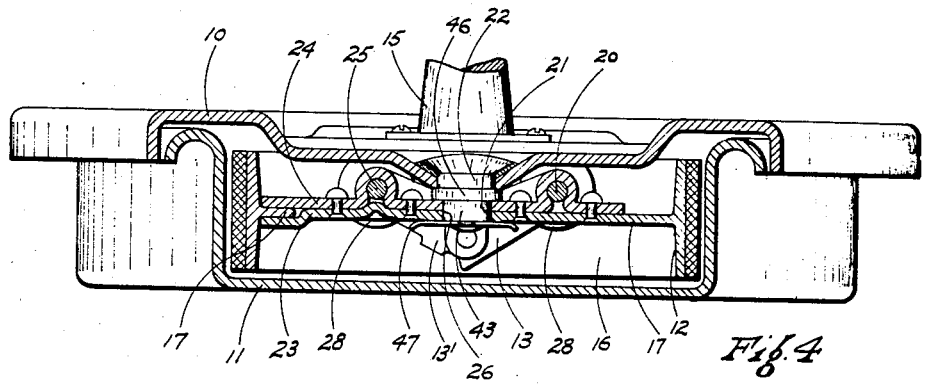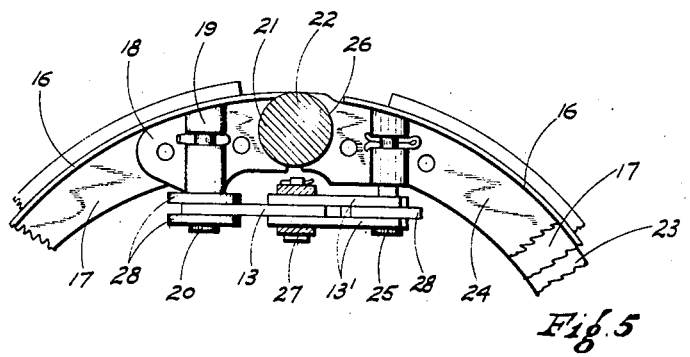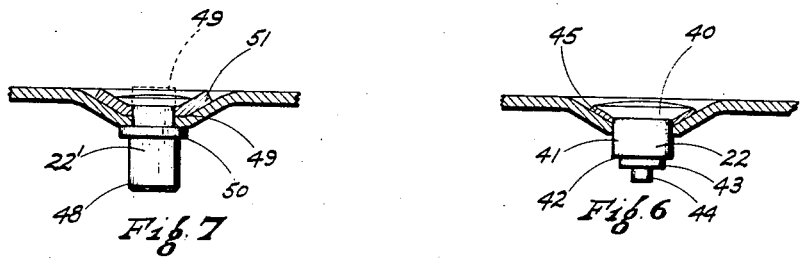

Patented Aug. 10, 1937

2,089,508

UNITED STATES PATENT OFFICE 2,089,508

BRAKE

John Sneed, Grosse Pointe Shores, Mich., assignor to The Midland Steel Products Company, Cleveland, Ohio, a corporation of Ohio, as trustee for Steeldraulic Brake Corporation Original application March 16, 1929, Serial No. 347,515, now Patent No. 2,035,843, March 31, 1936. Divided and this application July 17, 1930, Serial No. 468,522

6 Claims. (Cl. 188—78)

This invention relates to vehicle brakes, and has been divided from my co-pending application, Serial No. 347,515 filed March 16, 1929.

One object of this invention is to provide an improved apron or backing plate for a vehicle brake. Another object is to provide an improved anchorage to take the torque of the brake shoe which is of novel and simple construction and which is associated with the apron or backing plate in an effective manner. A further object of this invention is to arrange an apron, anchorage, and brake shoe in such a manner as to absorb the torque stresses most efficiently, and reduce to a minimum the lever arm resulting from the offset relation of the apron and brake shoe.

Other objects relating to details of construction and economies of manufacture will appear hereinafter.

In the accompanying drawings:

Fig. 4 is a view partly in section and partly in elevation of the improved brake asembly.

Fig. 5 is a detail elevational view of the ends of the brake shoe and the anchorage.

Fig. 6 is a detail sectional view through the apron and showing the manner of mounting the anchorage.

Fig. 7 is a similar view of a slightly modified construction.

Figures 1, 2, 3:
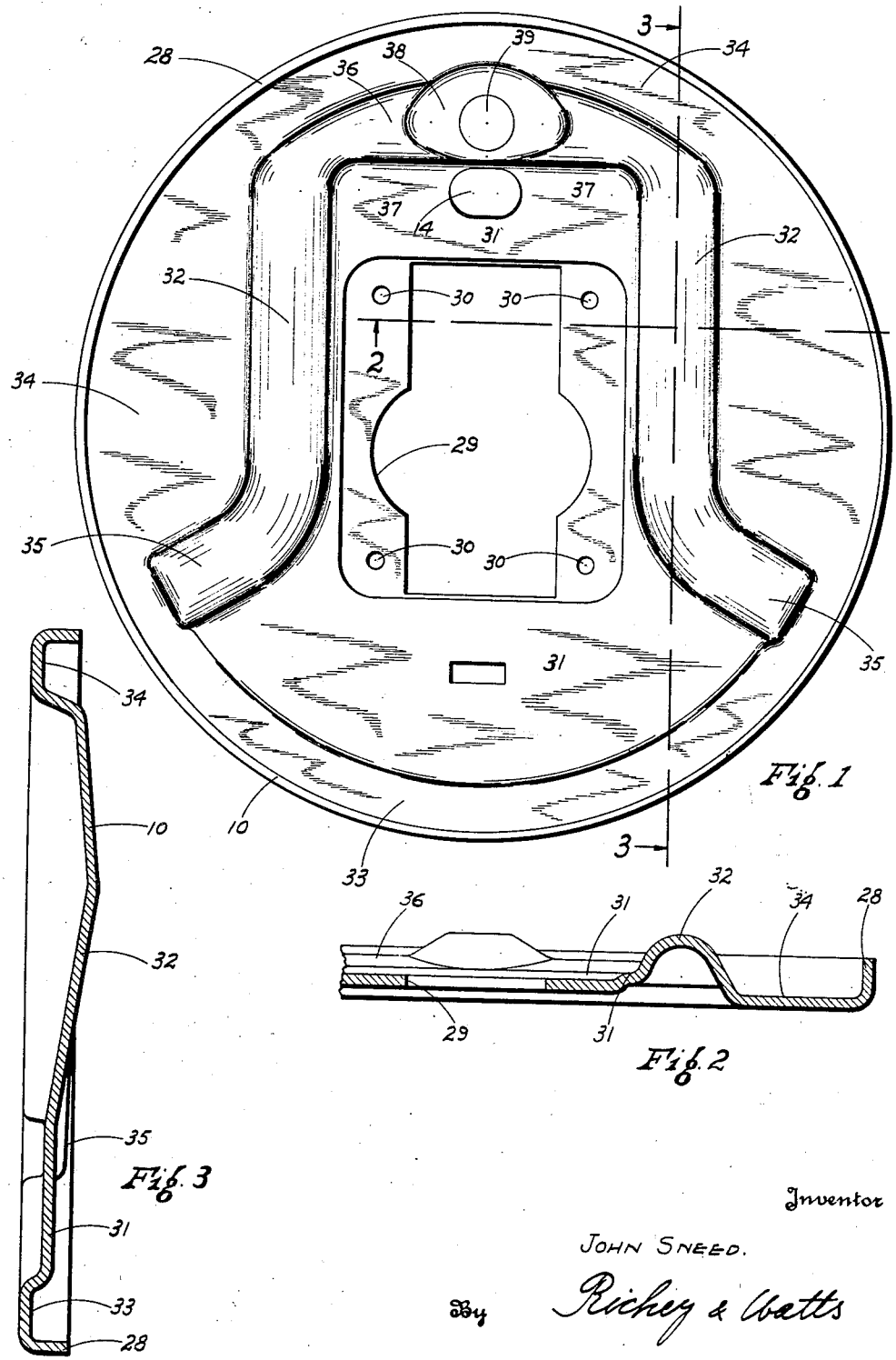
Fig. 1 is an elevation of the improved apron.
Fig. 2 is a section taken on the line 2—2 of Fig. 1.
Fig. 3 is a section taken on the line 3—3 of Fig. 1.

Referring to the drawings, the vehicle brake illustrated includes an apron or backing plate 10 fixed to a non-rotating part of the vehicle, and a drum 11 carried by a wheel. A brake shoe 12, which is preferably of split annular form as illustrated in my aforesaid application Serial No. 347,515 is resiliently carried by the apron 10 and is arranged to be expanded into braking engagement with the drum 11 by toggle links 13 and 13' arranged to be actuated by a cable or the like extending through an opening 14 in the apron and a housing 15 secured to and projecting from the apron.

The brake shoe 12 is preferably formed from T section stock and includes a cylindrical web portion 16 and a radial flange 17. At one end of the shoe a plate 18 is riveted or otherwise secured to the flange 17 and is formed with a loop 19 to receive a pin 20. The end of the flange 17 and the end of the plate 18 are recessed, as shown at 21, to abut an anchor pin 22. Plates 23 and 24 are secured to the opposite end of the flange 17 and carry the pin 25. The ends of these plates 23 and 24 are formed with a recess 26 to abut the opposite side of the anchor pin 22. Preferably these plates 23 and 24 are mounted for circumferential adjustment about the shoe 12 as disclosed in my aforesaid application Serial No. 347,515, in order to provide for adjustment of the brake.

The toggle links 13 and 13' are pivoted, respectively, to the pins 20 and 25, and are pivoted to each other and to the actuating cable by a pin 27. Rollers 28 may, if desired, be journalled on the pins 20 and 25 to bear against the apron 10 to take the lateral thrust of the actuating cable and prevent the brake shoe 12 from binding against the apron. It is to be understood, however, that any suitable type of bearing members may be used in place of the rollers if desired.

The apron 10 is preferably pressed from sheet metal and comprises essentially a disc with a flanged periphery 28 and a central opening 29 adjacent to which are smaller openings 30 for securing the apron to either the vehicle axle or the steering knuckle, the arrangement illustrated being designed for attachment to the steering knuckle. In the preferred embodiment, the apron includes a planular area 31 which extends generally around the central opening, and which is bounded above and laterally by an inverted U shaped rib 32 raised inwardly toward the brake shoe. The lower boundary of the planular area 31 is the channel 31' into which the edge of the brake drum 11 extends. Above and on each side of the rib 32 is a lower planular area 34 formed in the plane of the bottom of the channel 33. The rib 32, as illustrated, has generally the shape of an inverted U having its lower extremities 35 turned and extending radially outward and terminating in the lower planular area 33—34. The extremities of the rib 32 are preferably spaced about 120 degrees apart and are arranged to contact the brake shoe 12 and support the same out of contact with the apron.

The upper ends of the legs of the rib 32 and the horizontal portion 36 thereof are spaced radially inward from the periphery of the apron a greater amount than the extremities 35 so that the lateral edge of the brake shoe 12 will not contact with the rib or apron except on the extremities 35. As described above, the ends of the shoe are laterally supported by the rollers 28, and these rollers contact the apron at 37 and may move to the right or left in the planular area 31 on either side of the opening 14. Thus the shoe is supported from the apron at three general points spaced about 120 degrees apart. Suitable retractor springs, such as disclosed in my aforesaid application Serial No. 347,515, are provided to hold the shoe in retracted position and in lateral engagement with the apron.

The anchor pin which receives the torque from the ends of the brake shoe is associated with the horizontal portion 36 of the rib 32. A conoidal boss 38 is raised inwardly from the rib 32 immediately above the opening 14, and a central aperture 39 is formed therein. The anchor pin 22 is secured to the boss 38 through the aperture 39 and is thereby attached to the apron as close as possible to the line of thrust of the brake shoe, in order to reduce the lever arm, and is arranged to distribute the torque forces through the rib 32 to the body of the apron.

One form of anchor pin is illustrated in Figs. 4 and 6. This pin 22 is preferably shaped as shown in Fig. 6 by an upsetting operation which forms the head 40, the cylindrical portion 41 terminating in the shoulder 42, and the successively smaller cylindrical portions 43 and 44. The pin 22 is inserted through the aperture 39 as shown in Fig. 6, and a non-metallic shim 45, such as disclosed and claimed in my prior Patent No. 1,726,045, granted Aug. 27, 1929, may if desired, be interposed between the head 40 and the outer wall of the boss 38. The cylindrical portion 41 of the pin is then deformed or upset by a hollow die having an interior bore fitting over the cylindrical portion 43 and having a cutting edge and face engaging the shoulder 42 to force and shear the metal rearwardly and outwardly into an integral annular ring 46 engaging the inner surface of the boss 38 and rigidly securing the pin 22 to the apron 10. A washer 47 is placed on the cylindrical portion 44 and is retained thereon by upsetting or riveting the portion 44 to secure the washer against the end face of the portion 43.

The upsetting operation expands the cylindrical portion 41 into firm engagement with the walls of the aperture 39, in addition to clamping the boss rigidly between the head 40 and the ring or flange 46. The seats 21 and 26 on the ends of the shoe 12 engage the anchor pin on the lengthened cylindrical portion 43 and are retained against lateral movement by the flange 46 and the washer 47.

The modified anchor pin 22' shown in Fig. 7 is initially upset into the form shown in dotted lines in Fig. 7 with cylindrical shanks 48 and 49 separated by an integral flange 50. The shank 49 is passed through the aperture 39, and a washer 51 of any suitable type is preferably placed thereon in engagement with the outer surface of the boss 38. It is preferred that the washer 51 be a metallic member with its ends angularly disposed to fit snugly against the inclined end portions of the conoidal boss 38, to reinforce the same against stress imposed upon the anchor pin. The end of the shank 49 is then upset against the washer 51 as shown in full lines in Fig. 7, thereby rigidly clamping the material of the boss 38 between the flange 50 and the upset end of the shank 49 and expanding the shank 49 into firm engagement with the walls of the aperture 39. If desired, this type of anchor pin may also be provided with a washer 47 such as shown in Fig. 4.

Although the foregoing description is necessarily of a detailed character in order that the invention may be fully set forth, it is to be understood that the specific terminology employed is not to be construed as restrictive or limiting, and it is to be further understood that various modifications and rearrangements of parts may be resorted to without departing from the spirit or scope of the invention as defined in the following claims.

I claim:

1. An anchorage for a brake comprising a plate with a circular opening about which the plate is deformed into an elongated substantially conical raised part, and a pin having an elongated substantially conical head engaging one side of the plate and spaced therefrom by a non-metallic shim, said pin having a cylindrical part engaging the periphery of said opening and an integrally formed up-set annular shoulder engaging the other side of said plate immediately adjacent the opening.

2. An anchorage for a brake comprising a plate with circular opening about which the plate is deformed into an elongated substantially conical raised part, and a pin having an elongated substantially conical head engaging one side of the plate and lying within said raised part, said pin having a cylindrical part engaging the periphery of said opening and an integrally formed up-set annular shoulder engaging the other side of said plate immediately adjacent the opening.

3. In a vehicle brake, a backing plate arranged to contact with a brake shoe at spaced points to maintain the major portion of the lateral edge of the brake shoe out of contact with the backing plate, a raised portion on said backing plate, and an anchor pin secured to said raised portion and arranged to receive torque from the brake shoe at a point closely adjacent the surface of said raised portion.

4. An anchorage for a brake comprising a plate with an aperture about which the plate is deformed into a substantially conoidal raised part, and a pin having a substantially conoidal adjacent one side of the plate and spaced therefrom by a shim, said pin having a shank portion engaging the periphery of said aperture, and an integral annular shoulder engaging the other side of the plate.

5. In a vehicle brake, a backing plate arranged to transmit braking torque from a brake shoe to a non-rotating part of the vehicle, said plate having a raised reinforcing rib extending in the line of application of braking torque and forming a depression in said plate, a metallic member snugly seated in said depression, and an anchor retaining said member in place and adapted to engage the brake shoe.

6. In a vehicle brake, a backing plate arranged to transmit braking torque from a brake shoe to a non-rotating part of the vehicle, said plate having a depression therein with opposed inclined portions, a metallic member seated in said depression and having inclined parts engaged with said inclined portions, and an anchor extending through said depressed portion of the plate and said member.

JOHN SNEED.